(12) United States Patent
Wobben

(10) Patent No.: US 7,875,991 B2
(45) Date of Patent: Jan. 25, 2011

(54) METHOD OF OPERATING A WIND POWER INSTALLATION AND A WIND POWER INSTALLATION

(76) Inventor: Aloys Wobben, Argestrasse 19, 26607 Aurich (DE)

( * ) Notice: Subject to any disclaimer, the term of this patent is extended or adjusted under 35 U.S.C. 154(b) by 0 days.

(21) Appl. No.: 12/540,077

(22) Filed: Aug. 12, 2009

(65) Prior Publication Data

US 2010/0025997 A1 Feb. 4, 2010

Related U.S. Application Data

(63) Continuation of application No. 11/675,912, filed on Feb. 16, 2007, now Pat. No. 7,595,563, which is a continuation of application No. 11/327,261, filed on Jan. 6, 2006, now Pat. No. 7,180,202, which is a continuation of application No. 10/733,687, filed on Dec. 10, 2003, now Pat. No. 6,984,898, which is a continuation of application No. 09/581,887, filed as application No. PCT/EP98/08324 on Dec. 18, 1998, now Pat. No. 6,784,564.

(30) Foreign Application Priority Data

Dec. 19, 1997 (DE) ................ 197 56 777

(51) Int. Cl.
 *H02P 9/44* (2006.01)
(52) U.S. Cl. .............. 290/44; 290/43; 322/29
(58) Field of Classification Search ........ 290/44, 290/55, 43, 54; 322/20, 37, 29, 22
See application file for complete search history.

(56) References Cited

U.S. PATENT DOCUMENTS 4,095,120 A 6/1978 Moran et al.
4,333,021 A 6/1982 Cresap et al.
4,695,736 A 9/1987 Dorman et al.
4,812,729 A 3/1989 Ito et al.

(Continued)

FOREIGN PATENT DOCUMENTS

DE 368 799 2/1923

(Continued)

OTHER PUBLICATIONS

"Industrial Process Control" by S.G. Lloyd and G.D. Anderson., Fisher Controls, 1997.

(Continued)

*Primary Examiner*—Nicholas Ponomarenko
(74) *Attorney, Agent, or Firm*—Gottlieb, Rackman & Reisman, P.C.

(57) ABSTRACT

The present invention concerns a method of operating a wind power installation comprising an electric generator drivable by a rotor for outputting electrical power to an electrical consumer, in particular an electrical network.

The invention further concerns a wind power installation comprising a rotor and an electric generator coupled to the rotor for outputting electric power to an electrical consumer, in particular an electrical network.

The object of the present invention is to provide a method of operating a wind power installation, and a wind power installation, which avoid the disadvantages of the state of the art and in particular avoid voltage over-fluctuations at the consumer, in particular an electrical network, and unwanted shutdown of the wind power installation.

In a method of the kind set forth in the opening part of this specification, that object is attained by the invention in that the power delivered to the network by the wind power generator is regulated in dependence on the applied network voltage of the power supply network.

15 Claims, 2 Drawing Sheets

U.S. PATENT DOCUMENTS

| | | | |
|---|---|---|---|
| 4,994,684 | A | 2/1991 | Lauw et al. |
| 5,083,039 | A | 1/1992 | Richardson et al. |
| 5,187,427 | A | 2/1993 | Erdman |
| 5,278,773 | A | 1/1994 | Cousineau |
| 5,422,561 | A | 6/1995 | Williams et al. |
| 5,637,985 | A | 6/1997 | Kakizaki et al. |
| 5,798,632 | A | 8/1998 | Muljadi |
| 6,137,187 | A | 10/2000 | Mikhail et al. |
| 6,600,240 | B2 | 7/2003 | Mikhail et al. |
| 6,680,856 | B2 | 1/2004 | Schreiber |
| 6,724,097 | B1 * | 4/2004 | Wobben ............ 290/44 |
| 6,784,564 | B1 | 8/2004 | Wobben |
| 6,856,039 | B2 | 2/2005 | Mikhail et al. |
| 6,856,041 | B2 | 2/2005 | Siebenthaler et al. |
| 6,906,431 | B2 | 6/2005 | Wobben |
| 6,924,627 | B1 | 8/2005 | Wobben |
| 6,933,625 | B2 | 8/2005 | Feddersen et al. |
| 6,958,550 | B2 | 10/2005 | Gilbreth et al. |
| 6,965,174 | B2 * | 11/2005 | Wobben ............ 290/44 |
| 6,984,898 | B2 * | 1/2006 | Wobben ............ 290/44 |
| 7,095,130 | B2 * | 8/2006 | Ichinose et al. ............ 290/44 |
| 7,180,202 | B2 * | 2/2007 | Wobben ............ 290/44 |
| 7,205,676 | B2 * | 4/2007 | Ichinose et al. ............ 290/44 |
| 7,291,937 | B2 * | 11/2007 | Willisch et al. ............ 290/44 |
| 7,321,221 | B2 * | 1/2008 | Bucker et al. ............ 322/44 |
| 7,332,894 | B2 * | 2/2008 | Ichinose et al. ............ 322/29 |
| 7,355,296 | B2 * | 4/2008 | Ichinose et al. ............ 290/44 |
| 7,372,174 | B2 * | 5/2008 | Jones et al. ............ 290/44 |
| 7,453,242 | B2 * | 11/2008 | Ichinose et al. ............ 322/29 |
| 7,462,947 | B2 * | 12/2008 | Wobben ............ 290/44 |
| 7,514,809 | B2 * | 4/2009 | Edenfeld ............ 290/44 |
| 7,554,302 | B2 * | 6/2009 | Schauder ............ 322/44 |
| 7,595,563 | B2 * | 9/2009 | Wobben ............ 290/44 |
| 2004/0178639 | A1 | 9/2004 | Wobben |
| 2004/0207206 | A1 | 10/2004 | Wobben |

FOREIGN PATENT DOCUMENTS

| | | |
|---|---|---|
| DE | 30 23195 | 12/1981 |
| DE | 343 889 3 | 4/1986 |
| DE | 383 371 9 | 10/1989 |
| DE | 44 28 085 | 2/1996 |
| DE | 296 21449 | 3/1997 |
| JP | 07-194196 | 7/1995 |
| WO | WO 92/14298 | 8/1992 |

OTHER PUBLICATIONS

"Switchgear and Control Handbook" by Robert W. Smeaton, McGraw Hill, 1977.

"The Technical Sensation: Enercon-40": undated brochure by ENERCON GmbH, Aurich-Germany; 14 pp.; all portions in English language 2001.

"E-40 Short Description: Rotot Generator Grid"; undated brochure except for telefax date Nov. 29, 2001; 16 pages; by ENERCON; all portions in English language.

"The Benchmark in Windenergy Technology E-40"; undated brochure except for May 12, 2003 date stamp perhaps by EPO; 1-28pp.; by ENERCON; all portions in English language.

"Power Conversion for the Connection to the Medium-Voltage Grid of a Variable Speed Wind Generator"; Mar. 6-12, 2003 at European Community Wind Energy Conference in Lubeck.

"Del 3: Overtoner Og Driftsforhold Ved Invertetilsluttede Vindmoller"; brochure dated Jan. 1996 in Lyngby, Denmark; 65-67pp in Danish; pertinent portions in English language.

"Grid Integration of Wind Energy Conversion Systems"; 1998 copyright by John Wiley & Sons, West Sussex, England; 210-211pp., 273-278pp, 326-339pp; by Siegfried Heier of Kassel.

"DEFU: Nettilslutning Af Vinmoller", Committee Report 77; 4 pages in Danish; all portions in English language.

"Declaration Concerning Grid Monitioring in Wind Turbines Manufactured and Sold by Bonus Energy A/S"; Apr. 7, 2004; by Henrik Stiesdal, Technical Director of Bonus Energy A/S.

"Error Response List"; dated Jan. 12, 1997 1-19pp; by supplier KK-Electronic A/S and manufacturer Bonus Energy A/S; all portions in English language.

Dewek '96: Deutsche Winenergie-Konferenz ; group session held on Oct. 24, 1996; presented by DEWI (Deutsches Windenergie-Institut Gemeinnutzige GmbH); Meeting No. 1-10 with Ta.

"Windkraftanlagen Im Netzbetrieb"; 1996 copyright, published by BG Teubner Stuttgart; author Siegfried Heier of Kassel University in Germany;.

"Error Response List"; dated Jan. 12, 1997; 1-19pp; by supplier KK-Electronic A/S and manufacturer Bonus Energy A/S; all portions in English language.

Dewek '96: Deutsche Winenergie-Konferenz; group session held on Oct. 24, 1996; presented by DEWI (Deutsches Windenergie-Institut Gemeinnutzige GmbH); Meeting Nos. 1-10 with T.

"Windkraftanlagen Im Netzbetrieb"; 1996 copyright, published by BG Teubner Stuttgart; author Siegfried Heier of Kassel University in Germany.

"Problems and Their Countermeasures in System Interconnection of a Compact Photovoltaic Power Generation System" by Takigawa et al, Eletical Engineering Laboratory, Jan. 1988.

* cited by examiner

METHOD OF OPERATING A WIND POWER INSTALLATION AND A WIND POWER INSTALLATION

This application is a continuation of U.S. application Ser. No. 11/675,912 filed Feb. 16, 2007 now U.S. Pat. No. 7,595,563, now allowed which is a continuation of U.S. application Ser. No. 11/327,261 filed Jan. 6, 2006, now U.S. Pat. No. 7,180,202; which is a continuation of Ser. No. 10/733,687 filed Dec. 10, 2003, now U.S. Pat. No. 6,984,898; which is a Continuation of Ser. No. 09/581,887 filed Jul. 19, 2000, now U.S. Pat. No. 6,784,564; which was a National Stage Entry of PCT/EP98/08324 filed Dec. 18, 1998 which claims the priority date of German Patent application 197 56 777.0 filed Dec. 19, 1997 all incorporated herein by reference.

The present invention concerns a method of operating a wind power installation comprising an electric generator drivable by a rotor for outputting electrical power to an electrical consumer, in particular an electrical network.

The invention further concerns a wind power installation comprising a rotor and an electric generator coupled to the rotor for outputting electric power to an electrical consumer, in particular an electrical network.

In the known wind power installations for generating electrical energy from wind the generator is operated in parallel relationship with the electrical consumer, frequently an electrical network. During operation of the wind power installation the electric power produced by the generator varies in dependence on the prevailing wind speed and thus the wind power. The consequence of this is that the electrical generator voltage is also variable in dependence on the wind power. That gives rise to the following problems:

In the event of the electrical power generated being fed into an electrical network, for example a public power supply network, there is an increase in the network voltage at a connecting point or network junction point at which the electrical generator power is fed into the network. Particularly in the event of severe changes in the generator voltage, there are severe unwanted changes in the network voltage.

Under particular circumstances it can happen that the network voltage in the supply network rises to an undesirably high value. That is the case in particular when the power taken on the part of the consumers is very low while a high level of electrical power is being fed into the supply network. Such situations can occur for example at night when the electrical consumption in households is fairly low while with a strong wind, a wind power converter provides the power supply network with a correspondingly high level of electrical power. If the voltage in the supply network or at the network connection point of the wind power installation rises above a predetermined value, the wind power installation or the generator thereof has to be disconnected from the network and the wind power installation would have to be completely shut down from the network because it is no longer possible to take any power. A shut-down procedure of that kind results in an interruption in the feed of electrical power, which is unwanted equally from the point of view of the operator of the wind power installation and the operator of the network.

It is generally known from German patent specification No 368 799, DE-OS No 44 28 085 and DE-OS No 30 23 195 that, in installations such as wind power installations or solar generators, the power produced by the generator fluctuates, which gives rise to the above-described problems in terms of the feed of power into the network.

The object of the present invention is to provide a method of operating a wind power installation, and a wind power installation, which avoid the disadvantages of the state of the art and in particular avoid voltage over-fluctuations at the consumer, in particular an electrical network, and unwanted shut-down of the wind power installation.

In a method of the kind set forth in the opening part of this specification, that object is attained by the invention in that the power supplied to the network by the wind power generator is regulated in dependence on the applied network voltage of the power supply network.

In an apparatus of the kind set forth in the opening part of this specification, the object of the invention is attained by a regulating device having a voltage sensor for sensing an electrical voltage applied at the consumer, for example network voltage, so that the power supplied to the consumer by the generator can be regulated in dependence on the voltage sensed by the voltage sensor.

As described, in the case of energy generation, there can be a fluctuation in the energy which can be generated, which in the case of wind power installations is governed by natural conditions in dependence on wind strength. Those fluctuations however are not the basic starting point of the invention. On the contrary, the invention is concerned with the problem that fluctuations in power consumption also occur on the consumer side, which has an effect in the form of a fluctuating network voltage. It is known that such network voltages are critical because electrical equipment—in particular computers—are frequently only inadequately safeguarded against critical voltage fluctuations. The invention therefore provides that not just the fluctuation in energy generation on the generator side but also the fluctuation on the consumer side is taken into consideration in regard to the feed of energy into the system so that the electrical voltage produced is regulated at the feed-in point to the desired reference value.

The invention avoids unwanted fluctuations in the voltage applied at the consumer, in particular the electrical voltage in a network, insofar as the electrical power delivered by the generator is regulated in dependence on the voltage of the consumer or the network. That also avoids unwanted voltage fluctuations which can arise out of changes in wind power.

A further advantage of the invention is that, even with very substantial changes in wind power, the wind power installation does not need to be shut down in order to avoid fluctuations in the network system. In accordance with the invention, even with considerable changes in wind power, the wind power installation continues to be operated without changes in network voltage occurring. For that purpose the regulating device according to the invention is equipped with voltage sensors for sensing the voltage at the consumer or the network.

In addition, with a constant wind power, it is possible by means of the invention to compensate for network fluctuations as regularly occur in electrical networks for energy power supply as some consumers connected to the network from time to time draw large amounts of power from the network, and that can result in a reduction in voltage. In the case of such a reduction in voltage the wind power installation according to the invention can feed an increased amount of electrical power into the network and in that way it can compensate for voltage fluctuations. For that purpose the feed-in voltage is raised at the interface between the wind power installation and the network, for example on the basis of the network voltage value which is sensed in accordance with the invention.

In accordance with a preferred embodiment of the method according to the invention the power supplied is regulated by the electrical voltage produced being regulated to a desired reference value. In this case network voltage compensation can be implemented in a particularly simple manner, which— as described hereinbefore—can occur when a consumer connected to the network requires a large amount of power.

In accordance with a further preferred embodiment of the invention the electrical voltage is produced in the form of ac voltage at a predeterminable frequency. In that way the power fed into the system can be adapted to the conditions in the network and the network frequency can be influenced thereby. The predeterminable frequency desirably corresponds to the network frequency.

A further development of the wind power installation according to the invention advantageously involves a regulating device having a microprocessor as digital regulation can be implemented in that way.

The invention is described hereinafter by means of an embodiment of a method of operating a wind power installation with reference to the drawings in which.

Figure 1:
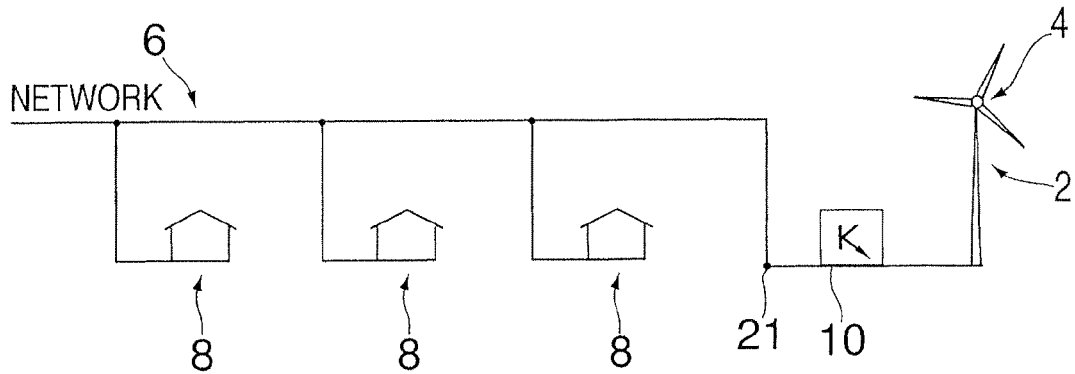
FIG. 1 is a diagrammatic view of a wind power installation which feeds into a network.

A wind power installation 2 diagrammatically illustrated in FIG. 1 and having a rotor 4 is connected to an electrical network 6 which for example can be a public network. Connected to the network are a plurality of electrical consumers 8.

The electric generator (not shown in FIG. 1) of the wind power installation 2 is coupled to an electrical control and regulating arrangement 10 which firstly rectifies the alternating current generated in the generator and then converts it into an ac voltage which corresponds to the network frequency. Instead of a network 6, it would also be possible to supply electrical energy to an individual consumer from the wind power installation 2. The control and regulating arrangement 10 has a regulating device according to the invention.

Figure 2:
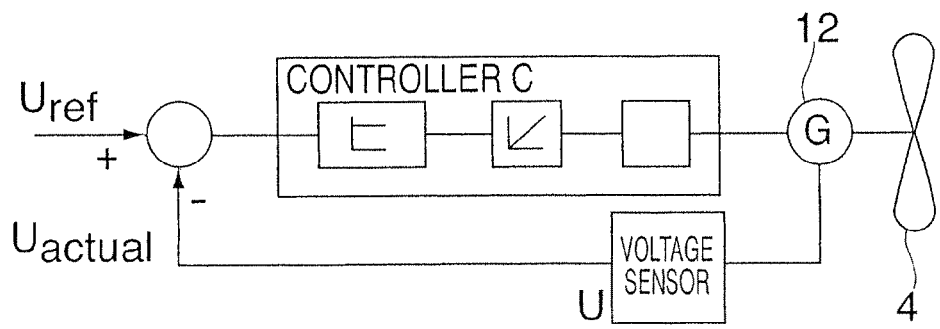
FIG. 2 shows a regulating device according to the invention for the operation of a wind power installation.

FIG. 2 shows the regulating device according to the invention. The diagrammatically illustrated rotor 4 is coupled to a generator 12 producing electrical power which depends on the wind speed and thus the wind power. The ac voltage generated in the generator 12 can firstly be rectified and then converted into an ac voltage which is of a frequency corresponding to the network frequency.

Figure 4:
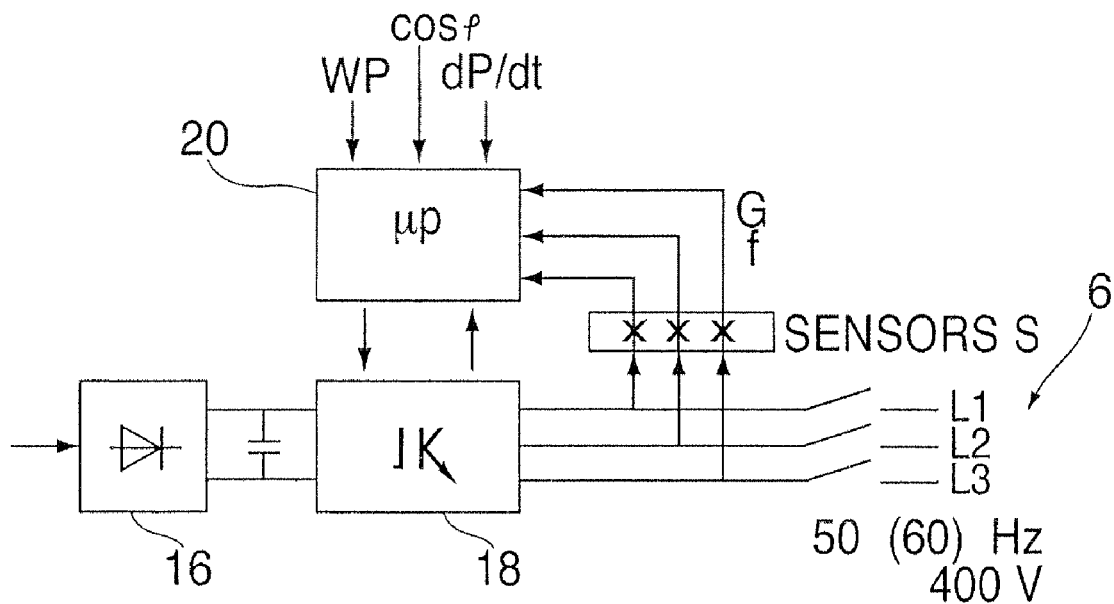
FIG. 4 shows the components of the control and regulating arrangement 10 in FIG. 1.

The network voltage is ascertained at a location in the network 6 (FIG. 1) by means of a voltage sensor (not shown). An optimum generator voltage $U_{ref}$ (see FIG. 2) is calculated in dependence on the ascertained network voltage, possibly by means of a microprocessor which is shown in FIG. 4. The generator voltage $U_{actual}$ is then regulated to the desired voltage value $U_{ref}$ by means of the regulating device. That regulation of the generator voltage provides for regulation of the electrical power which is delivered by the generator 12 to a consumer, in the illustrated embodiment being the network 6, and which is fed into the network 6. By virtue of a feed regulated in that way of the power delivered by the wind power installation, into the network, fluctuations in the network voltage in the network 6 can be avoided or considerably reduced.

Figure 3:
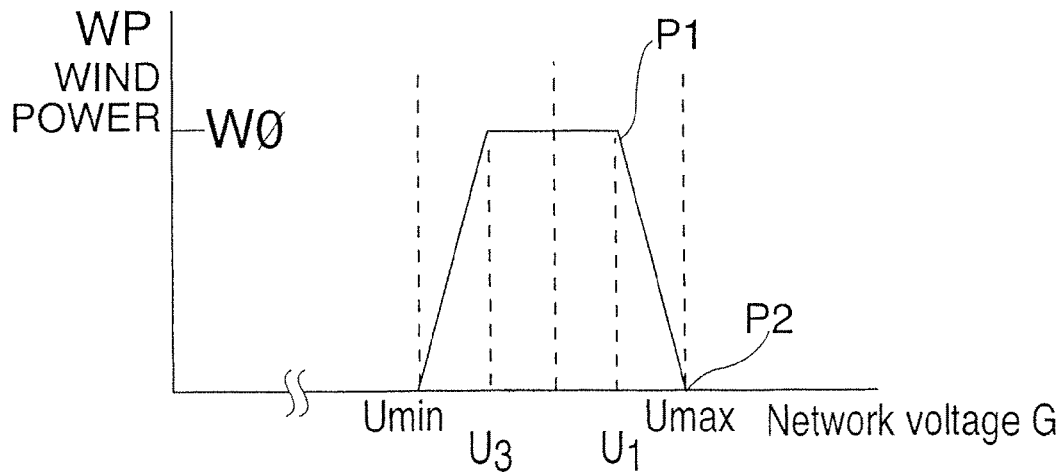
FIG. 3 is a diagram showing the relationship between wind power and network or mains voltage.

The diagram illustrated in FIG. 3 shows the relationship between the power which is entered on the ordinate and which is delivered by the wind power installation and the network voltage which is plotted on the abscissa. If the network voltage differs only little from its reference value which is between the voltage values $U_{min}$ and $U_{max}$ then a uniform level of power is delivered to the network by the generator, corresponding to the upper straight portion of the curve (straight line parallel to the abscissa). If the network voltage rises further and exceeds a value which is defined by the point P1, the power fed into the network is reduced. When the value $U_{max}$ is reached, then the power fed into the network is equal to zero (point P2). Even in the case where there is a high level of wind power, no power is fed into the network at point P2. If the wind power falls sharply, then only a reduced amount of power can still be fed into the network. Even if no further power is delivered on the part of the wind power converter, the latter—although without delivering power—continues to be operated so that power delivery can always be effected as soon as the mains voltage has again assumed a value between $U_{min}$ and $U_{max}$.

FIG. 4 shows essential components of the control and regulating arrangement 10 in FIG. 1. The control and regulating arrangement 10 has a rectifier 16 in which the ac voltage produced in the generator is rectified. A frequency converter 18 connected to the rectifier 16 converts the initially rectified dc voltage into an ac voltage which is fed into the network 6 by way of the lines L1, L2 and L3, in the form of a three-phase ac voltage. The frequency converter 18 is controlled by means of a microcomputer 20 which is part of the overall regulating device. For that purpose the microprocessor 20 is coupled to the frequency converter 18. The input parameters for regulation of the voltage with which the electrical power afforded by the wind power installation 2 is fed into the network 6 are the current network voltage U, the network frequency f, the electrical power P of the generator, the reactive power factor cos φ and the power gradient dP/dt. Regulation in accordance with the invention of the voltage to be fed into the network is implemented in the microprocessor 20.

Figure 5:
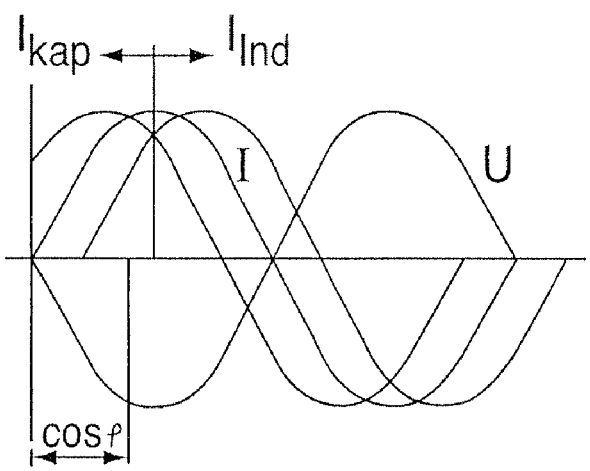
FIG. 5 shows the variation of the voltages and currents of the three phases of the network 6 as a function of time.

FIG. 5 shows the variation in respect of time of the voltages and currents of the three phases of the network 6.

The invention claimed is:

1. A wind power installation generating power and transferring it to a network having a network parameter, comprising:
    a wind-driven generator having an intermediate output and generating an intermediate electrical AC power; and
    an electrical control and regulator device including:
    a rectifier connected to said intermediate output and rectifying said intermediate AC power into DC power;
    a sensor connected to said network, sensing said network parameter and generating a sensor signal, said sensor signal being indicative of said network parameter;
    a microprocessor connected to said sensor, receiving said sensor signal and generating a control signal, said control signal being dependent on said sensor signal; and
    a frequency converter connected to said rectifier and said microprocessor, said frequency converter receiving said control signal and said DC power and converting said DC power into output AC power for feeding to said network, said output AC power having at least one output parameter, wherein said frequency converter is configured to generate said output AC power with said output parameter being dependent on said control signal.

2. The wind power installation of claim 1 wherein said output AC power is a three phase AC power.

3. The wind power installation of claim 1 wherein said sensor senses at least one of a network frequency, a network voltage and a network phase.

4. The wind power installation of claim 1 wherein said microprocessor is connected to said wind-driven generator and is adapted to determine at least one of the following control parameters: a current network voltage U, a current network frequency f, an electric power of the wind-driven generator, a reactive power factor, and a power gradient and wherein said microprocessor generates said control signal based on at least one of said control parameters and said network parameter.

5. The wind power installation of claim 1 wherein said sensor senses said network frequency and said frequency converter generates said output AC power at a frequency matching said network frequency.

6. The wind power installation of claim 1 wherein said sensor senses said network phase and said frequency converter generates said output AC power at a phase matching said network phase.

7. The wind power installation of claim 1 wherein said sensor senses said network voltage and said frequency converter generates said output AC power at a voltage at least equal to said network voltage.

8. A wind power installation generating power and transferring it to a network having a network parameter, comprising:
- a wind-driven generator having an intermediate output and generating an intermediate electrical AC current through said intermediate output; and
- an electrical control and regulator device including:
- a rectifier connected to said intermediate output and receiving and rectifying said intermediate AC current into a DC current;
- a sensor connected to said network, sensing said network parameter and generating a sensor signal, said sensor signal being indicative of said network parameter;
- a microprocessor connected to said sensor, receiving said sensor signal and generating a control signal, said control signal being dependent on said sensor signal; and
- a frequency converter connected to said rectifier and said microprocessor, said frequency converter receiving said control signal and said DC current and converting said DC current into an output AC current for feeding to said network, said output AC current having at least one output parameter, wherein said frequency converter is configured to generate said output AC current with said output parameter being dependent on said control signal.

9. The wind power installation of claim 8 wherein said output AC current is a three phase AC current.

10. The wind power installation of claim 8 wherein said sensor senses at least one of a network frequency, a network voltage and a network phase.

11. The wind power installation of claim 8 wherein said microprocessor is connected to said wind-driven generator and is adapted to determine at least one of the following control parameters: a current network voltage U, a current network frequency f, an electric power of the wind-driven generator, a reactive power factor, and a power gradient and wherein said microprocessor generates said control signal based on at least one of said control parameters and said network parameter.

12. The wind power installation of claim 8 wherein said sensor senses said network frequency and said frequency converter generates said output AC current at a frequency matching said network frequency.

13. The wind power installation of claim 8 wherein said sensor senses said network phase and said frequency converter generates said output AC current at a phase matching said network phase.

14. The wind power installation of claim 8 wherein said sensor senses said network voltage and said frequency converter generates said output AC power at a voltage at least equal to said network voltage.

15. The wind power installation of claim 8 further comprising an energy storage device coupled to said rectifier for storing said DC current.

* * * * *